Sept. 29, 1959      E. C. MATHIS      2,906,082
SAFETY GUARD FOR ROTARY LAWN MOWERS
Filed March 25, 1957
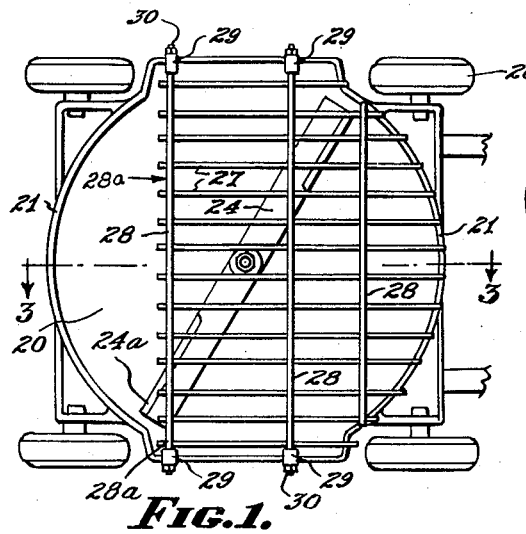
FIG.1.
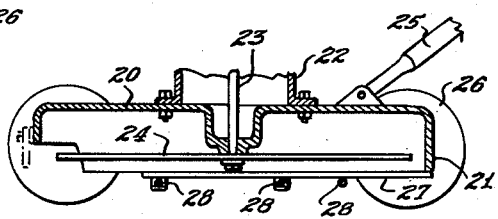
FIG.3.
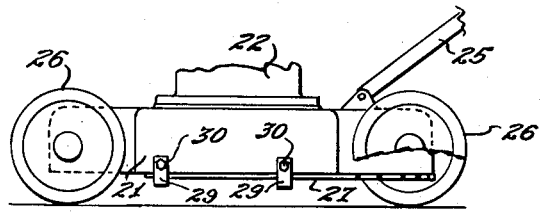
FIG.2.
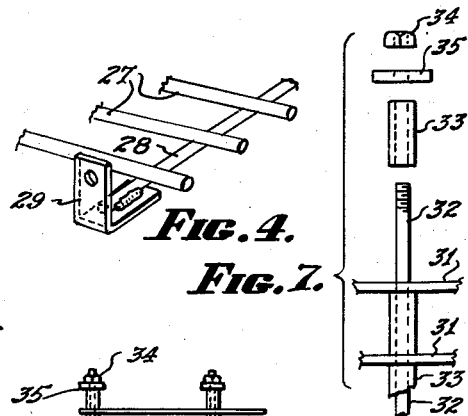
FIG.4.
FIG.7.
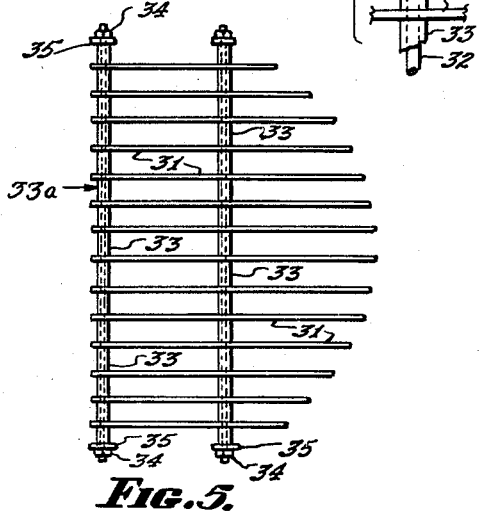
FIG.5.
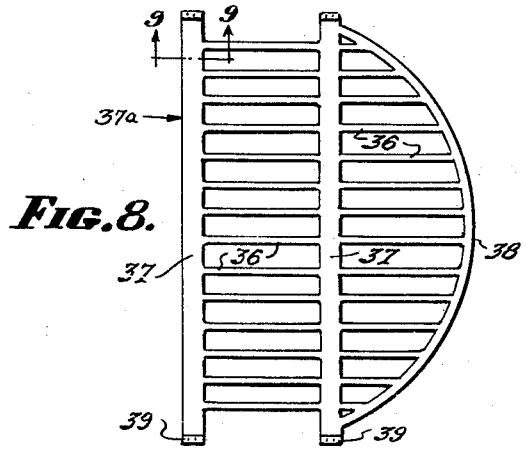
FIG.8.
FIG.6.
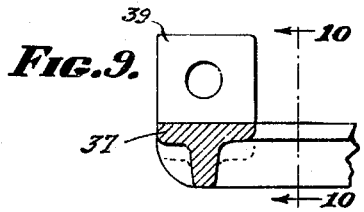
FIG.9.
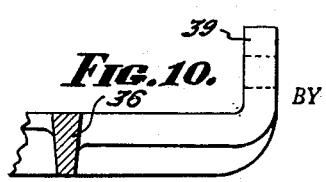
FIG.10.
INVENTOR.
EARL C. MATHIS,
BY Allen & Allen
ATTORNEYS.

United States Patent Office 2,906,082
Patented Sept. 29, 1959

2,906,082

SAFETY GUARD FOR ROTARY LAWN MOWERS

Earl C. Mathis, Covington, Ky., assignor to Weber Engineered Products, Inc., Cincinnati, Ohio, a corporation of Ohio Application March 25, 1957, Serial No. 648,298

6 Claims. (Cl. 56—25.4)

This invention resides in the provision of a novel and effective safety guard for rotary lawn mowers to prevent one from having his foot contacted by the cutting blade by making the blade inaccessible from the rear or sides of the lawn mower.

In recent years the rotary lawn mower has become extremely popular. This lawn mower comprises a housing on which is mounted a motor to drive an elongated blade which is encased within the housing parallel to the ground surface. The skirted housing offers a measure of protection but it still and far too frequently happens that a rotary lawn mower will roll back on the feet of the user, or the user will thrust his feet under the casing while endeavoring to make adjustments and so forth, with the result that the blade will oftentimes severely damage the user and his clothing.

There have been attempts made to provide some kind of guard structure to prevent accidents like those just mentioned. Heretofore, however, such guards have either been ineffective or they have materially cut down the efficiency of the lawn mower as a good instrument for cutting grass.

A very important object of this invention is to provide a satisfactory guard for use in connection with rotary lawn mowers which will not only protect the user from injury caused by the rotating blade but which also have very little appreciable effect on the grass cutting efficiency of the lawn mower.

It is also an important object of this invention to provide a guard structure which is rigid and sturdy and which will not be forced into contact with the rotating blade by contact with rocks and other debris which may be encountered.

Another object of this invention is to provide a guard structure which is economical to manufacture and simple to apply.

Yet another object of this invention is to provide a guard structure which not only protects the user from contact with the cutting blade but which also serves to prevent scalping of lawns and the like.

These and other objects of this invention will become apparent from the course of the description to follow and from reference to the accompanying drawing, in which drawing like numerals are employed to designate like parts and in which:

Figure 1 is a fragmentary bottom view of a rotary lawn mower to which the safety guard of this invention has been applied, Figure 2 is a fragmentary side elevation of the lawn mower and guard of Figure 1, Figure 3 is a section taken on the line 3—3 of Figure 1, Figure 4 is a perspective view of another manner in which the guard elements may be associated, Figure 5 is a plan view of another guard structure embodying the teachings of this invention, Figure 6 is a side elevation of the guard structure of Figure 5, Figure 7 is a fragmentary exploded view of a portion of the arrangement of Figure 5, Figure 8 is a plan view of another form of the safety guard of this invention, Figure 9 is an enlarged section on the line 9—9 of Figure 8, and Figure 10 is a section on the line 10—10 of Figure 9.

Referring now to Figures 1, 2 and 3 the rotary lawn mower, which is exemplary only, is illustrated as having a housing 20 which is provided with a peripheral skirt 21. A suitable motor is generally indicated at 22. It will be understood that there is a drive shaft 23 extending therefrom and terminating within the confines of the skirted housing 20—21. Suitably mounted on the lower end of this drive shaft 23 is a cutting blade 24. A handle for the lawn mower is indicated at 25. The structure is mounted on a plurality of wheels 26 by conventional means. The rotating blade 24 will cut down the grass, weeds and so forth. The structure as so far described is generally old and well known in the art and does not constitute a limitation on this invention except insofar as it is specifically related to the novel structure now to be described and except insofar as this relationship is specifically set forth in the subjoined claims.

The safety guard structure of Figures 1 through 4 is comprised of a plurality of rods 27 which are parallel one to the other and which are arranged parallel to the direction of movement of the lawn mower. These rods 27 are maintained by a plurality of rods 28 located at right angles thereto. These rods 27 and 28 may be projection welded one to another. Right angle bracket members 29 are fixed on each end of two of the rods 28. With the brackets 29 thus located the guard structure may be easily fastened beneath the housing 20—21 by means of bolts and nuts engaged between the member 29 and skirt 21 as generally indicated at 30.

In the arrangement of Figures 1 through 4 the rods 27 vary in length. It will be observed that these rods will extend from the rod 28 farthest to the left as viewed in Figure 1 to the rear portion of the skirt 21, it being understood that the direction of lawn mower movement is from the right to the left as viewed in Figure 1. Since the housing and skirt 20—21 is shown as generally circular it will be obvious that the rods 27 located adjacent the center of the mower will have to be longer than those located near the sides. As indicated, the rods 27 and 28 are firmly fixed with respect to one another and this may be accomplished by the known process of projection welding. This arrangement gives a very sturdy and rigid guard made up of round rods. It will also be understood that the rods 27 are located sufficiently close to one another to prevent one's shoe from passing between them into contact with the blade 24. It will also be understood that these rods 27 lie adjacent the lower edge of the depending peripheral skirt 21. The guard is held in place by the pair of members 28 having the brackets 29 fixed thereto; the third member 28 simply adds rigidity to the structure and does not have to be connected to the skirted housing.

An important feature of the guard structure of this invention is the fact that the guard structure terminates short of the area contacted by the blade 24. This is very important. The guard structure is disposed only beneath the sides and rear of the lawn mower housing, such terms being relative to the direction of movement of the lawn mower. The forward portion of the skirted housing remains open. Since it is the sides and rear which are most critical from a standpoint of possible injury the fact that the front is left open is not a disadvantage even from the standpoint of guarding the user. From the standpoint of lawn mower operation it is very advantageous to have such front portion free of the guard structure. This concept of providing a guard structure only under a certain portion of the rotating blade 24 underlies the invention as here presented. The end of the lawn mower blade 24, as indicated at 24a in Figure 1, must clear the guard structure 27—28 in order for good grass cutting results to be achieved. As the lawn mower is moved over the grass to be cut it is important that substantially all of this grass is contacted by the blade 24 prior to the time that it is contacted by the guard structure 27—28 in order to insure a proper cutting of the grass. In the arrangement shown in Figure 1 only at the very sides of the mower as indicated at 28a will the guard structure contact the grass before or at about the same time as it is contacted by the end 24a of the blade 24. A little of this overlapping does not interfere very much with the grass cutting ability of the mower but it does afford more complete protection at the sides of the mower and is therefore desirable.

In Figures 5 through 7 another form of the invention is illustrated. In this arrangement there are rectangular rails 31 which correspond to the rods 27. These rails 31 are maintained in position on a pair of rods 32. The rails 31 may be press fitted on the rods 32. There are a plurality of spacing elements 33 which have a slip fit on the rods 32, each such element 33 being located between adjacent rails 31. The ends of the rods 32 are threaded to receive nuts 34 by which a bracket member 35 may be fixed to the rod 32. Nuts and bolts may be employed to fasten the members 35 to the skirt 21 of the lawn mower housing and in this manner the guard structure 31—33 is maintained in position beneath the lawn mower blade 24.

Again, as emphasized in the description of the guard structure of Figures 1 through 4, the leading edge of the guard structure of Figures 5 through 7, considered in the direction of lawn mower movement during the grass cutting operation, terminates short of the front edge of the lawn mower housing so that the lawn mower blade 24 will project forwardly of the leading edge of such guard structure. In this manner the sides and rear of the lawn mower are fully protected while the front remains open for good grass cutting results.

Another modification of this invention is shown in Figures 8 through 10. In these figures the guard structure is shown as comprised of a plurality of parallel rails 36 which may be joined by a pair of parallel members 37 located at right angles to the members 36. In addition the rear ends of the members 36 may be joined by a member 38. Preferably the members 36, 37 and 38 are cast as an integral unit. In this connection it has been found desirable to make the members 37 T-shaped and the members 36 slightly V-shaped. The ends of the members 37 are cast with projections 39 which serve as mounting brackets for the guard structure. Nuts and bolts may secure the guard through such brackets to the peripheral skirt 21 of the mower housing 20.

As in the case of the arrangements of the Figures 1 through 4 and Figures 5 through 7, the guard structure of Figures 8 through 10 is designed to have its leading edge terminate short of the front of the lawn mower so that the blade 24 will extend beyond such leading edge during the grass cutting operation. This concept of providing protection for a portion of the lawn mower only, namely, the sides and rear, leaving the forward portion open so as to be contacted by the cutting ends of the rotating blade, has resulted in the various guard structures herein shown and described, all of which are believed to be novel and patentable.

In the various figures of the accompanying drawing the guard structures of this invention are shown as applied to lawn mower housings which are substantially circular in cross section; this showing is exemplary only. It will be readily apparent to those skilled in the art that the principles of this invention may be easily applied to other rotary lawn mower housings of different shapes. The involved principle is to make sure that the guard elements disposed parallel to direction of lawn mower movement, during the cutting operation, extend from a point short of the front of the housing area occupied by the rotating blade to a point which will insure that substantially all of the rear portion of such blade-housing area is covered. And, of course, there will be a sufficient number of such parallel members to extend throughout the full width of the mower housing in order to give full protection. The rotating blade must, however, be free to project beyond the leading edge of the guard structure substantially from side to side of the housing. Since it will usually be necessary to locate the leading edge (28a, 33a and 37a respectively) of the guard structure between the center of the housing as defined by the point of engagement of the blade 24 with the drive shaft 23, and the forward part of the mower housing, it will necessarily follow that there will be some slight impairment of the grass cutting ability of the blade at the sides of the mower just before it clears from under the guard structure. If the leading edge of the guard structure were dropped back to a point on a line at right angles to the direction of movement of the lawn mower, which line passed through the center of the housing, then there would not be this side interference with the cutting ability of the blade but it would also follow that there would not be complete side protection.

It will be understood by those skilled in the art that modifications may be made in the structures of this invention without departing from the scope and spirit thereof. It will be further understood that while the invention has been shown as embodied in certain structures and arrangements, such showing has been exemplary only and the invention is not to be construed as limited to them except insofar as they are specifically set forth in the subjoined claims.

Having thus described the invention, what is claimed as new and what is desired to be protected by United States Letters Patent is:

1. In a rotary lawn mower having a skirted housing and a blade rotatable therewithin, the skirt of said housing being disposed substantially about the perimeter of the area occupied by the rotating blade, the improvement which comprises: a grill-like guard structure underlying said blade and attached to opposite sides of said skirt, said grill-like guard structure having a front part extending across the forward part of the skirt and a rearward part in substantial contact with said skirt, whereby said blade projects beyond the front part of said grill-like guard structure, and whereby the rearward part of said grill-like guard structure underlies said blade thus permitting cutting of grass and passage thereof through said grill-like guard structure to the ground while protecting the feet of the operator.

2. The arrangement of claim 1 in which said grill-like guard structure comprises a first series of elongated members disposed parallel to one another and extending from said front part of said grill-like guard structure to said rearward part of said grill-like guard structure, and a second series of elongated members located at right angles to said first series.

3. The arrangement of claim 2 in which one of said second series of elongated members extends across the skirt adjacent those ends of said first series of elongated members which are at said front part of said grill-like guard structure.

4. The arrangement of claim 2 in which said first and said second series of elongated members are fastened together to form a substantially rigid unitary structure.

5. The arrangement of claim 3 in which the elongated members of said first series are of different lengths and extend from adjacent said one of said second series of elongated members to said rearward part of said grill-like guard structure.

6. The arrangement of claim 5 in which said first series of elongated members are uniformly spaced from one another, there being sufficient of said first series of elongated members to underlie substantially all of said blade from said one of said second series of elongated members to said skirt.

References Cited in the file of this patent

UNITED STATES PATENTS

| | | |
|---|---|---|
| 2,242,524 | Hunt | May 20, 1941 |
| 2,312,972 | Orr | Mar. 2, 1943 |
| 2,318,430 | Spahn | May 4, 1943 |
| 2,539,779 | Grosso | Jan. 30, 1951 |
| 2,557,598 | Daggett | June 19, 1951 |

FOREIGN PATENTS

| | | |
|---|---|---|
| 143,932 | Australia | Oct. 24, 1951 |